United States Patent [19]

Dugge et al.

[11] 4,018,484
[45] Apr. 19, 1977

[54] PNEUMATIC OUTLET FOR RECEIVING FEMALE HOSE CONNECTIONS OF DIFFERENT DIAMETERS

[75] Inventors: Richard H. Dugge, St. Louis; Ronald D. Van Dyke, Florissant, both of Mo.

[73] Assignee: ACF Industries, Incorporated, New York, N.Y.

[22] Filed: Nov. 7, 1975

[21] Appl. No.: 629,959

[52] U.S. Cl. .............................. 302/52; 138/109; 285/177
[51] Int. Cl.[2] ..................................... B65G 53/52
[58] Field of Search ............... 302/52; 285/177; 214/83.28; 138/109

[56] References Cited

UNITED STATES PATENTS

| | | | |
|---|---|---|---|
| 290,045 | 12/1883 | Hardy | 285/177 |
| 2,190,727 | 2/1940 | McKenna | 302/52 |
| 3,048,448 | 8/1962 | Aller | 302/52 |
| 3,167,222 | 1/1965 | Koranda | 302/52 |
| 3,215,473 | 11/1965 | Kemp et al. | 302/52 |
| 3,248,026 | 4/1966 | Kemp | 302/52 |
| 3,701,460 | 10/1972 | Dugge et al. | 302/52 |
| 3,727,953 | 4/1973 | Martin et al. | 285/177 |
| 3,778,114 | 11/1973 | Carney et al. | 302/52 |

Primary Examiner—Evon C. Blunk
Assistant Examiner—Jeffrey V. Nase
Attorney, Agent, or Firm—Henry W. Cummings

[57] ABSTRACT

A pneumatic bottom discharge outlet for hoppers is provided having a tubular conduit extending from at least one side of the outlet to which vacuum suction or air under pressure may be applied for unloading lading from the discharge outlet. The tubular conduit has a first annular portion having an outer surface for receiving a female hose coupling of one diameter and a second annular portion projecting axially from the first annular portion and having an outer surface of a smaller diameter than the first annular portion for receiving a female hose coupling of a smaller diameter. The first and second annular portions are eccentric with the inner surface of the second annular portion being substantially tangent to the inner surface to the first annular portion to provide a smooth flow passage for lading flow during clean-out of the discharge outlet.

8 Claims, 4 Drawing Figures

4,018,484

PNEUMATIC OUTLET FOR RECEIVING FEMALE HOSE CONNECTIONS OF DIFFERENT DIAMETERS

BACKGROUND OF THE INVENTION

Pneumatic outlets have heretofore been provided having a tubular conduit projecting from a side of the outlet to which a single size of hose coupling may be attached to apply suction of air under pressure to unload the outlet. A pneumatic outlet of this type is shown and disclosed in U.S. Pat. No. 3,778,114. If a different size of hose is to be used, a special adapter must be provided. The adapter, however, must be removed when changing coupling sizes, and such adapters may be easily misplaced or lost.

It has also been proposed in U.S. Pat. No. 3,048,448 to provide a pair of nested concentric tubes to which male hose couplings of different diameters may be applied with a coupling of smaller diameter being received within the inner tube and a coupling of larger diameter being received within the outer tube. Such an arrangement, however, is not adapted to receive female hose couplings of different diameters, and special adapters would have to be used to accommodate female hose couplings of different diameters.

THE DRAWINGS

SUMMARY OF THE INVENTION

The present invention provides a pneumatic outlet to which female hose couplings of different diameters may be attached to the outlet without the necessity of using special adapters. The invention is particularly useful for accommodating either a suction hose or a smaller diameter air pressure hose, as the unloading equipment at a given unloading site may provide. In accordance with the invention, a tubular conduit extending from a side of the outlet includes a first annular portion having an outer surface for receiving a female hose coupling of one diameter and a second annular portion projecting axially from the first annular portion and having an outer surface of a smaller diameter than the first annular portion for receiving a female hose coupling of smaller diameter. As a feature of the invention, an inner surface of the second annular portion is substantially tangent to the inner surface of the first annular portion to provide a smooth flow path for lading during clean-out of the outlet.

DESCRIPTION OF PREFERRED EMBODIMENTS

Figure 1:
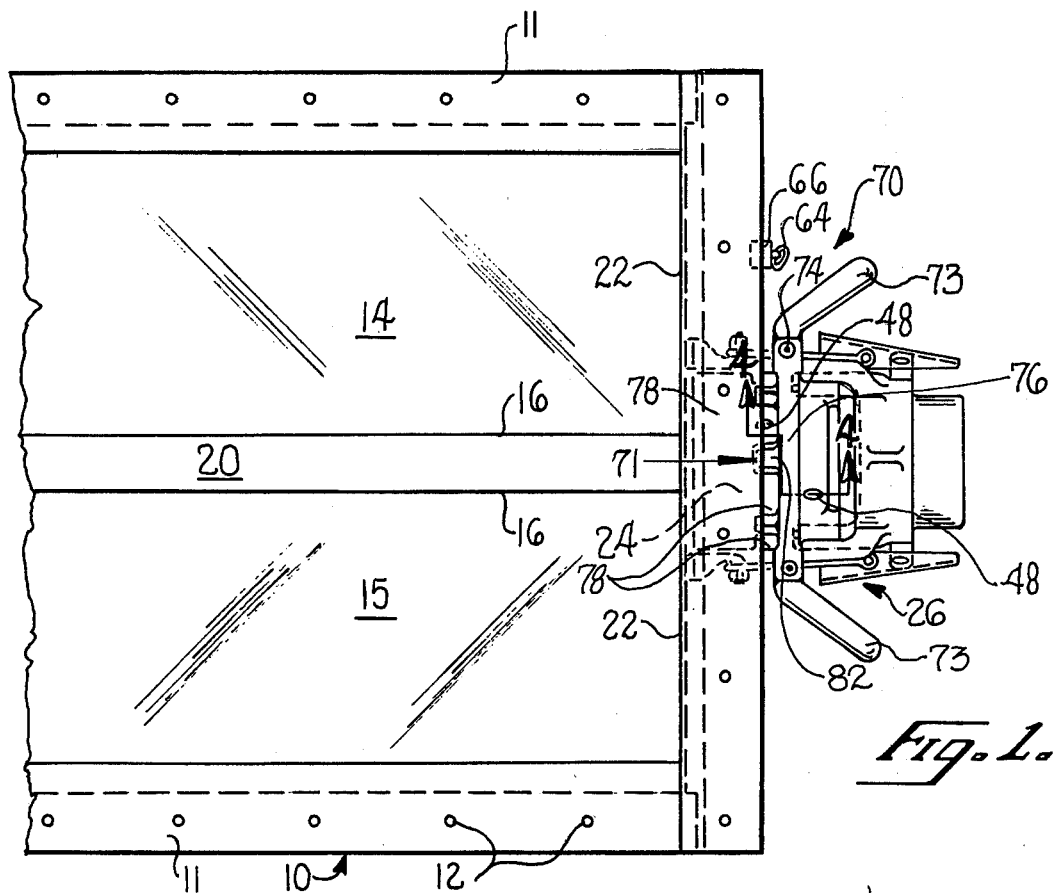
FIG. 1 is a partial plan view of the outlet of the present invention.
Figure 3:
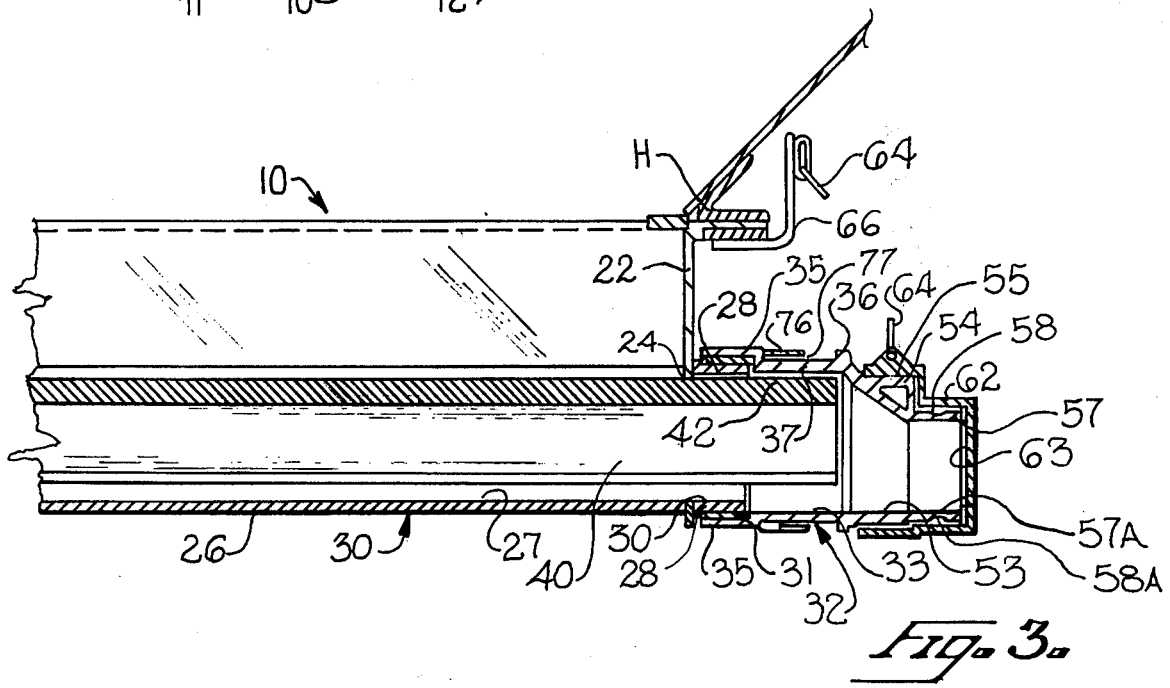
FIG. 3 is a sectional view looking in the direction of the arrows along the line 3—3 in FIG. 2 with the cap in place.
Figure 2:
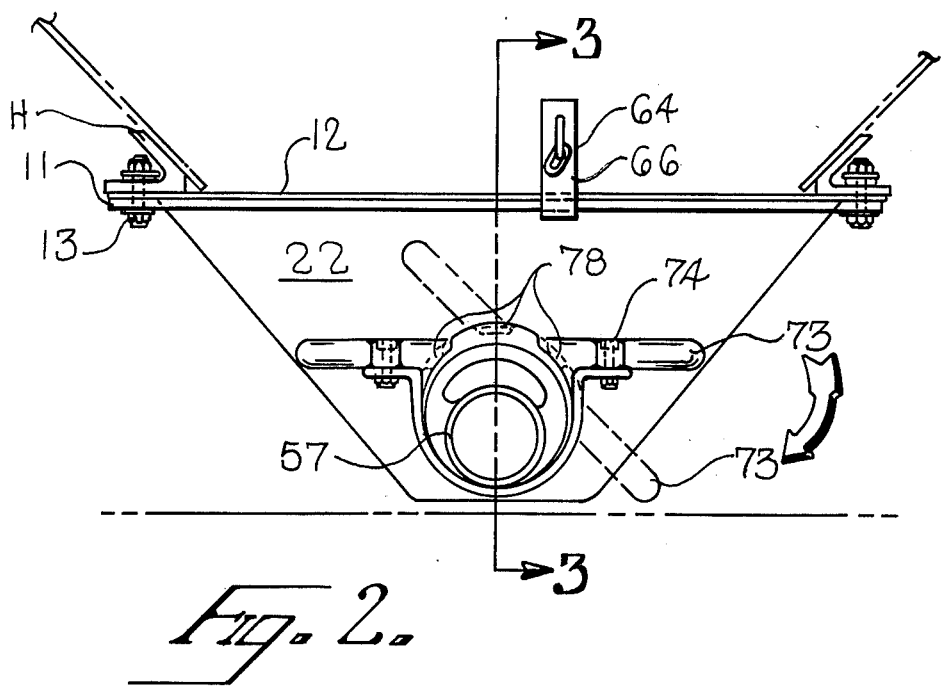
FIG. 2 is a front elevation view of the outlet shown in FIG. 2 with the end cap removed for clarity.

A pneumatic outlet incorporating the present invention is indicated in FIGS. 1–3 of the drawings generally at 10. The particular outlet 10 as shown is of the general type described in U.S. Pat. No. 3,778,114 and reference is made thereto for a more detailed description of the structure and operation thereof. It will be appreciated however, that the invention may be used with other types of pneumatic outlets having discharge conduits to which a hose may be attached.

In the drawings, only one-half of the outlet 10 is shown, the other half being identical to the half shown. The outlet 10 includes a mounting flange 11 (FIG. 3) having suitable openings 12 to facilitate mounting the outlet on a suitable hopper frame H with fasteners 13. Side walls 14 and 15 (FIG. 1) are inclined downwardly from the mounting flange, and the lower, inner edges 16 are spaced apart to define a longitudinally extending opening 20 in the outlet through which lading may pass. Connected to side walls 14 are vertical end walls 22, having respective openings therein 24.

A lower arcuate shaped housing or discharge trough indicated at 26 is secured to side walls 14 and 15, and end walls 22, and extends downwardly from edges 16 to provide a discharge trough for receiving lading passing through longitudinal opening 20. An end ring 28 is secured to each end wall 22 around the openings 24 and the inner surface 30 of end ring 28 is flush with the inner surface or bottom 27 of trough 26 to form a smooth continuation thereof as shown particularly in FIG. 3. A bearing 31 is mounted on each end ring 28 and a tubular conduit member 32 is mounted for rotation on each bearing 31. Conduit member 32 includes an enlarged portion 35 which rotates freely about the end ring 28 on the bearing 31. A circumferential rim 36 is provided on the conduit 32, spaced from the enlarged portion 35, and a cylindrical portion of reduced cross section 37 is provided between sleeve enlarged portion 35 and rim 36. As will be described in more detail hereafter, an operating assembly 70 is mounted on cylindrical portion 37 which may be used to rotate the conduit member 32.

Figure 4:
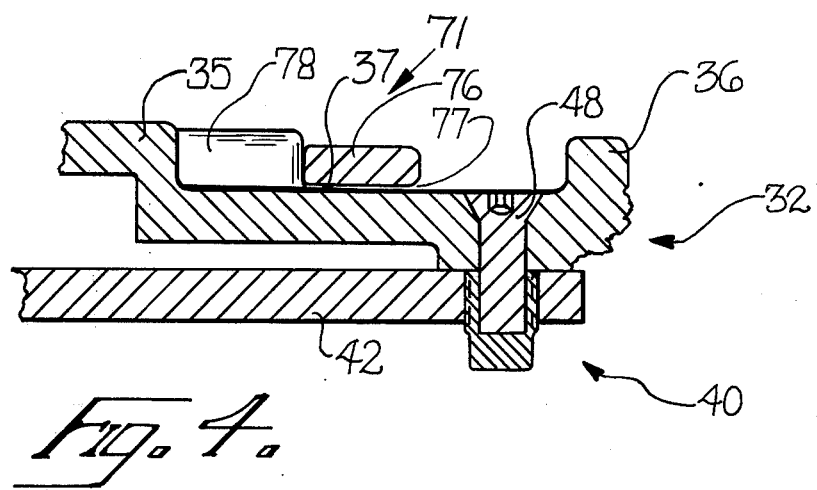
FIG. 4 is a partial sectional view looking in the direction of the arrows along the line 4—4 in FIG. 1.

Mounted for rotation within trough 26 is a discharge control valve indicated generally at 40. Control valve 40 includes a generally arcuate member 42 extending longitudinally within trough 26, and as described in U.S. Pat. No. 3,778,114, is so contoured as to in one position completely close off opening 20, and in other positions provide communication between the hopper and trough 26. Fasteners 48 (FIGS. 1 and 4) are provided to integrally affix the conduits 32 to the ends of the valve member 42 so that when conduit 32 is rotated by means of operating assembly 70, valve member 42 will rotate therewith. Valve member 42 may be rotated to a position allowing lading to pass through opening 20 into trough 26. Lading in the trough 26 may be removed by applying suction or air under pressure to the end of tubular conduit 32.

In accordance with the invention, the outer end of tubular conduit 32 includes a first annular portion 54 having a cylindrical outer surface 55 for receiving a female hose coupling (normally for a suction hose) of one diameter and a second annular portion 57 of smaller diameter projecting axially from the first annular portion 55 and having an outlet cylindrical surface 58 for receiving a female hose coupling of smaller diameter (normally for a pressure hose). The surface 58 may be provided with a groove 58a for receiving a latch of a conventional hose coupling for an air pressure hose.

In accordance with a feature of the invention, the first and second annular portions 54 and 57 are eccentric with the inner surface 53 of annular portion 54 being tangent to the inner surface 57a of annular portion 57. When the tubular conduit 32 is in the position shown in FIG. 3, surfaces 53 and 57a provide a smooth flow path for lading during clean out of the outlet. It will be also noted that the inner surface of the enlarged portion 35 of the tubular conduit 32 is also eccentric with the ring 28 whereby the lower inner surface 33 of cylindrical portion 37 is below the inner surface 30 of ring 28. Thus the lower surface 27 of discharge trough 26, surface 30 of end ring 28, surface 33 of conduit 32 and surfaces 53 and 57a of annular portions 55 and 57 all have the same height or are lower than the previous lading discharge path portion. None of the inner portions are lower than the outer portions whereby lading can become trapped therein during clean-out of the outlet, or where water or other cleaning fluid would collect during and/or after cleaning. Thus in handling ladings having stringent contamination limitations, the outlet does not have to be disassembled in switching from one such lading to another.

A suitable removable cap 62 appropriately contoured to fit on the surfaces 55 and 57 and having a seal 63 is provided for closing the end of the tubular conduit 32. Cap 62 is affixed to a chain 64 which preferably is affixed to a bracket 66 mounted on the outlet frame and prevents the cap 62 from getting lost or misplaced when the cap is removed while the outlet is being discharged.

The valve operating assembly 70 for rotating the tubular conduit 32 and valve member 40 is the subject matter of copending application Ser. No. 633,754 filed Nov. 20, 1975 assigned to the same assignee as the present application, and reference is made thereto for the details of the construction and function thereof. It is sufficient to an understanding of the present invention to note that the valve operating assembly 70 includes a clutch arrangement 71 including a pair of handles 73 integrally affixed by means of fasteners 74 to a ring 76. As is disclosed in detail in said Ser. No. 633,754, the clutch arrangement 71 is particularly adapted to application where there is minimal clearance between the discharge conduit 32, and the ground or outlet supporting surface, for example, where the outlet is mounted on a flat car deck of overland truck bed. Clearance is provided as indicated at 77 in FIG. 3 to allow rotary and axial movement of handles 72 and ring 76 along the cylindrical surface 37 of reduced cross section of the conduit 32, between enlarged portions 35 and rim 36. As shown in FIGS. 1 and 2, a plurality of clutch teeth 78 are provided circumferentially in the edge of enlarged portion 35 of conduit 32. Ring 76 is provided with a projecting tooth 82 appropriately dimensioned to engage between selected pairs of the teeth 78.

To rotate conduit 32 and valve member 40, handles 73 and ring 76 are moved inwardly to allow teeth 82 to engage between selected teeth 78. Handles 73 are then used to rotate conduit 32 and valve 40. As shown dotted in FIG. 2, when one of the handles 73 approaches the ground or supporting surface, which would prevent further rotation, handles 73 and ring 76 are first moved outwardly along cylindrical portion 37 to disengage tooth 82 from teeth 78. Handles 73 and ring 76 are then rotated relative to conduit 32, and move inwardly to engage the tooth 82 between another pair of teeth 78 to allow further rotation of conduit 32 and valve 40. This procedure may be used to rotate valve 40 in either direction to unload both sides of the outlet.

In operating the outlet to unload a hopper, caps 62 are first removed from the conduits 32 on each side of the outlet. If the unloading is to be by vacuum, a female coupling of a vacuum hose is applied to the surface 55 of the conduit 32, the conduit 32 is rotated by handles 73 to open valve 40, and suction is applied to the hose to suck out the lading.

If the unloading is to be by air under pressure, a female coupling of an air hose is connected to the surface 58 of the conduit 32 on one side of the outlet. A conveying hose is connected to either surface 55 or 58 of the conduit 32 on the other side of the outlet. The conduit 32 is rotated to open valve 40 and air pressure is applied through the air hose to force the lading out through the conveying hose connected to the conduit 32 on the other side of the outlet.

What is claimed is:

1. A pneumatic outlet for receiving female hose connections of different diameters comprising: a tubular conduit extending from at least one side of the outlet including a first annular portion having a first outer surface for receiving a female conduit coupling of one diameter from an unloading conduit adapted to extend from said outlet in a first direction; said first annular portion having a first inner surface of one diameter; a second annular portion projecting axially from the first annular portion and having a second outer surface of smaller diameter than said first outer surface for receiving a female hose coupling of smaller diameter from an unloading conduit adapted to extend from said outlet in said first direction; said second annular portion having a second inner surface of smaller diameter than said first inner surface; the first and second annular portions being eccentric with the lower inner surface of the second annular portion being tangent to the lower inner surface of said first annular portion and having a height not greater than the lower inner surface of the first annular portion to provide an effective flow path for lading discharge and clean-out of the outlet.

2. A pneumatic outlet for receiving female hose connections of different diameters comprising: a tubular conduit extending from at least one side of the outlet including a first annular portion having a first outer surface for receiving a female conduit coupling of one diameter from an unloading conduit adapted to extend from said outlet in a first direction; said first annular portion having a first inner surface of one diameter; a second annular portion projecting axially from the first annular portion and having a second outer surface of smaller diameter than said first outer surface for receiving a female hose coupling of smaller diameter from an unloading conduit adapted to extend from said outlet in said first direction; said second annular portion having a second inner surface of smaller diameter than said first inner surface; said second annular portion having means on said second outer surface for maintaining a hose coupling of an unloading conduit extending in said first direction in place on said outer surface; the first and second annular portions being eccentric with the lower inner surface of the second annular portion being tangent to the lower inner surface of said first annular portion and having a height not greater than the lower inner surface of the first annular portion to provide an effective flow path for lading discharge and clean-out of the outlet.

3. In a outlet adapted to be secured beneath a hopper comprising a pair of oppositely facing side walls sloping downwardly toward each other in a generally smooth relation and having spaced lower inner edges, a pair of end walls connecting the sloping side walls, a lower fixed trough beneath the spaced inner edges of the side walls and extending longitudinally between the end walls for receiving lading therein; a bearing ring secured to the outer surface of each end wall; a conduit rotatably mounted about the outer surface of each bearing ring, a valve member extending longitudinally in said trough and having end portions extending below each conduit and extending transversely between said spaced inner edges; means on said conduits securing respective end portions of the valve member to each conduit in a suspended relation for rotation with the conduit; the improvement comprising at least one of said conduits having a first annular portion having a first outer surface for receiving a female conduit coupling of one diameter from a discharge conduit adapted to extend from said outlet in a first direction; said first annular portion having a first inner surface of one diameter; a second annular portion projecting axially from the first annular portion and having a second outer surface of smaller diameter than said first outer surface for receiving a female hose coupling of smaller diameter from a discharge conduit adapted to extend from said outlet in said first direction; said second annular portion having a second inner surface of smaller diameter than said first inner surface; the first and second annular portions being eccentric with the lower inner surface of the second annular portion being tangent to the lower inner surface of said first annular portion and having a height not greater than the lower inner surface of the first annular portion to provide an effective flow path for lading during lading discharge and clean-out of the outlet.

4. An improved outlet according to claim 3 wherein said second annular portion includes means on said second outer surface for maintaining a hose coupling for a discharge conduit extending in said first direction in place on said outer surface.

5. An improved outlet according to claim 3 wherein both of said conduits have a first annular portion having a first outer surface for receiving a female conduit coupling of one diameter from a discharge conduit adapted to extend from said outlet in a first direction; said first annular portion having a first inner surface of one diameter; a second annular portion projecting axially from the first annular portion and having a second outer surface of smaller diameter than said first outer surface for receiving a female hose coupling of smaller diameter from a discharge conduit adapted to extend from said outlet in said first direction; said second annular portion having a second inner surface of smaller diameter than said first inner surface; the first and second annular portions being eccentric with the lower inner surface of the second annular portion being tangent to the lower inner surface of said first annular portion and having a height not greater than the lower inner surface of the first annular portion to provide an effective flow path for lading during lading discharge and clean-out of the outlet.

6. An improved outlet according to claim 3 wherein the lower inner surface of said conduit is not higher than the lower inner surface of said ring.

7. An improved outlet according to claim 6 wherein the lower inner surface of said conduit is located below the lower inner surface of said ring.

8. An improved outlet according to claim 7 wherein the lower inner surface of said ring forms a continuation at the same height as the lower inner surface of said trough.

* * * * *